US008938441B2

(12) United States Patent
Liao et al.

(10) Patent No.: US 8,938,441 B2
(45) Date of Patent: Jan. 20, 2015

(54) PRESENTING SEARCH RESULTS FOR GALLERY WEB PAGES

(75) Inventors: Yuguo Liao, Beijing (CN); Ning Wang, Beijing (CN)

(73) Assignee: Google Inc., Mountain View, CA (US)

(*) Notice: Subject to any disclaimer, the term of this patent is extended or adjusted under 35 U.S.C. 154(b) by 157 days.

(21) Appl. No.: 13/283,878

(22) Filed: Oct. 28, 2011

(65) Prior Publication Data

US 2012/0278338 A1    Nov. 1, 2012

Related U.S. Application Data

(63) Continuation of application No. 13/283,007, filed on Oct. 27, 2011, which is a continuation of application No. PCT/CN2011/073465, filed on Apr. 28, 2011.

(51) Int. Cl.
G06F 17/30 (2006.01)

(52) U.S. Cl.
CPC .... G06F 17/30864 (2013.01); G06F 17/30991 (2013.01)
USPC ........................................... 707/709

(58) Field of Classification Search
None
See application file for complete search history.

(56) References Cited

U.S. PATENT DOCUMENTS

| | | | |
|---|---|---|---|
| 6,049,821 A * | 4/2000 | Theriault et al. | 709/203 |
| 7,984,044 B2 | 7/2011 | Iwayama et al. | |
| 7,991,715 B2 | 8/2011 | Schiff et al. | |
| 8,086,600 B2 | 12/2011 | Bailey et al. | |
| 8,635,528 B2 * | 1/2014 | Byron et al. | 715/255 |
| 2004/0250205 A1 * | 12/2004 | Conning | 715/517 |
| 2005/0234904 A1 | 10/2005 | Brill et al. | |
| 2007/0088678 A1 * | 4/2007 | Farago et al. | 707/3 |
| 2007/0266022 A1 | 11/2007 | Frumkin et al. | |
| 2008/0044016 A1 * | 2/2008 | Henzinger | 380/201 |
| 2008/0056575 A1 | 3/2008 | Behm et al. | |
| 2008/0301127 A1 | 12/2008 | Gilmer et al. | |
| 2008/0313031 A1 | 12/2008 | Li et al. | |
| 2009/0034851 A1 * | 2/2009 | Fan et al. | 382/230 |
| 2009/0204610 A1 * | 8/2009 | Hellstrom et al. | 707/5 |
| 2009/0254515 A1 * | 10/2009 | Terheggen et al. | 707/2 |
| 2009/0254643 A1 * | 10/2009 | Terheggen et al. | 709/223 |
| 2010/0082594 A1 * | 4/2010 | Bhat et al. | 707/707 |
| 2010/0115396 A1 | 5/2010 | Byron et al. | |
| 2010/0287175 A1 | 11/2010 | Beaudreau et al. | |
| 2011/0029541 A1 | 2/2011 | Schulman | |
| 2011/0035345 A1 | 2/2011 | Duan et al. | |

(Continued)

OTHER PUBLICATIONS

Kohlschutter et al, Boilerplate detection using shallow text features, published in Web search and Data mining ACM, 2010.*

(Continued)

*Primary Examiner* — Kevin L Young
(74) *Attorney, Agent, or Firm* — Fish & Richardson P.C.

(57) ABSTRACT

Methods, systems, and apparatus, including computer programs encoded on a computer storage medium, for classifying web pages as gallery web pages, and for presenting search results for gallery web pages. In one aspect, a method includes receiving a web page that includes text and one or more images, evaluating one or more characteristics of the web page against predefined criteria, generating a score for the web page based on evaluating the characteristics of the web page against the predefined criteria, and classifying the web page as a gallery web page or as not a gallery web page when the score meets or does not meet a predefined threshold, respectively.

27 Claims, 9 Drawing Sheets

(56) References Cited

U.S. PATENT DOCUMENTS

2011/0078193 A1* 3/2011 Chen et al. .................. 707/780
2011/0173527 A1* 7/2011 Zunger ........................ 715/234

OTHER PUBLICATIONS

Hammami et al. WebGuard: Web Based Adult Content Detection and Filtering System published 2003 IEEE.*

"Structure and Semantics of Data-Intensive Web Pages: An Experimental Study on their Relationships" by Blanco et al., Journal of Universal Computer Science, vol. 14, No. 11 (2008), pp. 1877-1892 submitted Sep. 30, 2007, accepted Jan. 25, 2008, appeared Jan. 6, 2008@ J.UCS.

"Image Rating System for Filtering Web Pages with Inappropriate Contents" by Musha et al., MVA2002 IAPR Workshop on Machine Vision Applications, Dec. 11-13, 2002, Nara-ken New Public Hall, Nara, Japan, 13-14, 4 pages.

"IEEE Xplore—A visual search system for video and image databases" by Yu, H.-H; Wolf, W., appears in Multimedia Computing and Systems '97 Proceedings, IEEE International Conference on Jun. 3-6, 1997, pp. 517-524.

Office Action for U.S. Appl. No. 13/283,007 dated Feb. 17, 2012. 9 pages.

International Search Report and Written Opinion for PCT/CN2011/073465 mailed on Mar. 1, 2012. 10 pages.

Office Action for U.S. Appl. No. 13/293,003 dated Jun. 15, 2012, 18 pages.

Office Action for U.S. Appl. No. 13/293,003 dated Jul. 18, 2014, 17 pages.

* cited by examiner

600

```html
<html>
<head><title>sample page</title></head>
<body>
<table border="0" cellspacing="0" cellpadding="5" width="700" dir="ltr">
    <tr>
        <td>
            <img title=rose1 src="../pic/t1.gif" border=0 width="155" height="120">
        </td>
        <td>
            <img title=rose2 src="../pic/t2.gif" border=0 width="160" height="130">
        </td>
        <td>
            <img title=rose3 src="../pic/t3.gif" border=0 width="155" height="120">
        </td>
        <td>
            <img title=rose4 src="../pic/t4.gif" border=0 width="160" height="130">
        </td>
    </tr>
    <tr>
        <td>
            <a href="url1" title="title11" >
                <img title=rose11 src="../pic/t11.gif" border=0 width="180" height="150">
            </a>
        </td>
        <td>
            <a href="url2" title="title12" >
                <img title=rose12 src="../pic/t12.gif" border=0 width="155" height="120">
            </a>
        </td>
    </tr>
</table>
</body>
</html>
```

FIG. 6

GRAND CANYON NATIONAL PARK, PHOTOS

100 IMAGES ... JUL 27, 2007 ... 〜〜〜 〜〜 〜〜 〜〜 〜〜
〜〜〜 〜〜〜 〜〜〜〜 〜〜〜
〜〜〜 〜〜〜 〜〜〜 〜〜

WWW.NPS.GOV/GRCA/PHOTOS/ - 34K CACHED - SIMILAR PAGES -

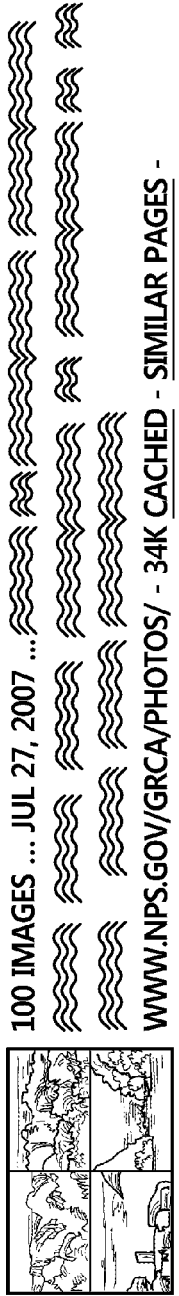

FIG. 8C

GRAND CANYON NATIONAL PARK, PHOTOS

JUL 27, 2007 ... 〜〜〜 〜〜〜 〜〜
〜〜〜 〜〜〜 〜〜〜 〜〜
〜〜 〜〜〜 〜〜〜 ... 99 IMAGES

WWW.NPS.GOV/ARCHIVE/GRCA/PHOTOS/ -
CACHED - SIMILAR PAGES

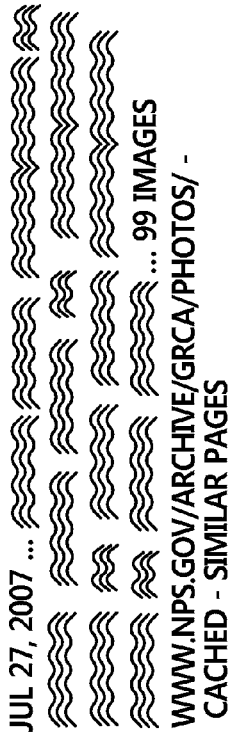

FIG. 8D

GRAND CANYON NATIONAL PARK PICTURES – US NATIONAL PARKS STOCK ...

15+ IMAGES ... 〜〜〜 〜〜〜 〜〜 〜〜 〜〜 〜〜
〜〜〜 〜〜〜 〜〜〜 〜〜

WWW.TERRAGALLERIA.COM/PARKS/NP.GRAND-CANYON-CANYON.HTML - 51K - CACHED - SIMILAR PAGES -

FIG. 8E

PRESENTING SEARCH RESULTS FOR GALLERY WEB PAGES

CROSS-REFERENCE TO RELATED APPLICATIONS

The present application is a continuation of U.S. patent application Ser. No. 13/283,007, filed Oct. 27, 2011, which is a continuation of PCT/CN2011/073465, filed Apr. 28, 2011, titled PRESENTING SEARCH RESULTS FOR GALLERY WEB PAGES. The contents of the prior applications are incorporated herein by reference in their entirety.

BACKGROUND

Different web pages may include different types of content. For example, a text-intensive web page contains primarily text content, while an image-intensive web page contains primarily image content.

SUMMARY

In general, one innovative aspect of the subject matter described in this specification may be embodied in a method for classifying web pages as gallery web pages or as not gallery web pages, and for presenting search results for web pages that have been classified as gallery web pages. Generally, a "gallery web page" is a web page that includes multiple images and may also include text, and the principal content of which is its images.

One method for classifying a web page as a gallery web page includes selecting a candidate web page for analysis, and identifying one or more images from the web page. Characteristics of the web page and/or the images are evaluated against one or more predefined criteria, and a score is generated based on the evaluation. In some examples, this generating the score involves counting all or some of images included on the web page, or counting the number of images from the web page that individually satisfy the predefined criteria.

The candidate web page is classified as a gallery web page if the score meets a predefined threshold, or is classified as not a gallery web page if the score does not meet the predefined threshold. A label or tag that designates a web page as a gallery web page is stored to identify the web pages that are classified as gallery web pages.

Search engines may treat web pages that are classified as gallery web pages differently than web pages that have not yet been classified, or that are classified as not gallery web pages. In one example, a search result that includes a reference to a gallery web page may appear differently in a listing of search results than a search result that does not include a reference to a gallery web page. For instance, a search result that includes a reference to a gallery web page may include a larger or smaller snippet of text from the gallery web page than a search result that does not include a reference to a gallery web page. Additionally, a search result that includes a reference to a gallery web page may include an image from the gallery web page, a description of an image from the gallery web page, a preview or thumbnail version of an image from the gallery web page, or any other visual indication that indicates that the search result references a gallery web page.

By contrast, a search result that does not include a reference to a gallery web page may merely include information that is typically associated with web pages that are not gallery web pages, and may not include the information that would be included if the search result referenced a gallery web page. By treating gallery web pages differently than web pages that are not gallery web pages, a search engine may provide more relevant and interesting search results, thereby enhancing the experience of the user of the search engine. Furthermore, providing a preview of an image from a gallery web page in a search result provides the user a useful preview or indication of the content of the gallery web page.

In general, another innovative aspect of the subject matter described in this specification may be embodied in a method for classifying web pages. The method includes receiving a web page that includes text and one or more images, and evaluating one or more characteristics of the web page against predefined criteria. The method also includes generating a score for the web page based on evaluating the characteristics of the web page against the predefined criteria, and classifying the web page as a gallery web page or as not a gallery web page when the score meets or does not meet a predefined threshold, respectively.

In general, another innovative aspect of the subject matter described in this specification may be embodied in a method that includes determining, by a search engine, that a web page that is classified as a gallery web page is responsive to a search query, and selecting a gallery-web-page-specific search result format. The method also includes formatting a search result that identifies the web page according to the selected, gallery-web-page-specific search result format, and providing the formatted search result that identifies the web page for display in a list of search results.

These and other embodiments may each optionally include one or more of the following features. For instance, evaluating one or more characteristics of the web page against predefined criteria includes evaluating an area of the web page that is covered by images, against a minimum value, evaluating an amount of text that is included on the web page, against a maximum value, evaluating a quantity of images included on the web page, against a minimum value, evaluating a quantity of images of the web page that share a same Document Object Model (DOM) path, against a minimum value, or evaluating a quantity of images of the web page that are not of an excluded type of image, using a minimum value. The excluded type of image includes an image that includes pornographic content or advertising content, or an image that is included in a boilerplate section of the web page.

In some examples, evaluating one or more characteristics of the web page using predefined criteria includes evaluating a quantity of images of the web page that individually satisfy the predefined criteria, against a minimum value. The predefined criteria specifies a minimum altitude on the web page. The web page is classified as a gallery web page if and only if the score meets the predefined threshold. The method includes selecting a subset of the images, where evaluating one or more characteristics of the web page includes evaluating characteristics of the subset of the images of the web page only. The method includes labeling a web page that is classified as a gallery web page, as a gallery web page, or a web page that is classified as not a gallery web page, as not a gallery web page.

In additional examples, the method includes determining, after the web page has been classified as a gallery web page, that the web page is responsive to a search query, selecting a gallery-web-page-specific search result format, and presenting a search result for the web page in a list of search results, where the search result for the web page is formatted according to the selected, gallery-web-page-specific search result format.

In other examples, a gallery web page is a web page in which its principal content is images. The formatted search result that identifies the web page includes a preview of an image from the web page. The gallery-web-page-specific search result format is selected from among multiple available search result formats.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 6 is an example of a HyperText Markup Language (HTML) document containing various HTML elements for displaying images.

FIGS. 8A-8E are different examples of search results that reference gallery web pages.

Like reference numbers and designations in the various drawings indicate like elements.

DETAILED DESCRIPTION

Figure 1:
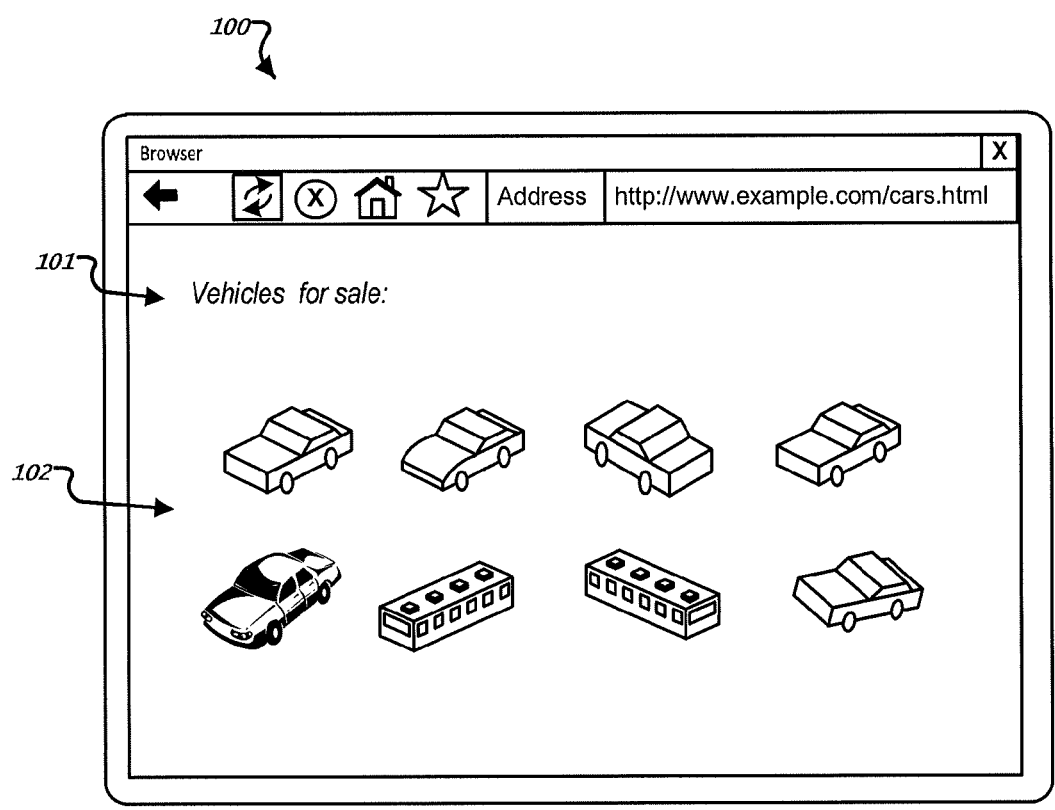
FIG. 1 illustrates an example web page that includes text and images.

FIG. 1 illustrates an example web page 100 that includes text 101 and images 102. The quantity, size, content, type, order, and/or arrangement of the images 102 suggests that the principal content of the web page 100 is the images 102, rather than the text 101. The web page 100 may therefore be regarded as a gallery web page.

The web page 100 may be automatically classified as a gallery web page because it includes characteristics that are indicative of gallery web pages. The characteristics of the web page 100, or the characteristics of all or some of the images 102 of the web page 100, may be evaluated by a classifier using any number of predefined criteria. A score may be generated based on this evaluation, where the score may be used by the classifier to determine whether the web page 100 should be classified as a gallery web page, or as not a gallery web page.

In one example, the characteristics of the web page 100 may be evaluated using minimum image size criteria. Because the images of a gallery web page typically cover a large area of a gallery web page, the minimum image size criteria may specify a minimum value (e.g., 5%, 10%, 25%, 33%, or 50%) representing an amount of the display area of the web page 100 may be covered by the images 102, in order for the web page 100 to be classified as a gallery web page.

Another example of the predefined criteria is maximum text amount criteria. Because the principal content of gallery web pages is images rather than text, the maximum text amount criteria may specify a maximum value (e.g., 100 words) representing an amount of the text 101 that the web page 100 may include, in order for the web page 100 be classified as a gallery web page.

In other examples, the web page 100 may be classified as a gallery web page based in part on the total number of images 102, or the total number of images 102 which individually meets other quantity, size, order, quality, or arrangement criteria. For instance, the web page 100 may be classified as not a gallery web page if it includes no images, or if it includes three or fewer images. Further, the web page 100 may be classified as a gallery web page based in part on the total quantity of the images 102 that are displayed in an upper part of the web page 100, or may be classified as not a gallery web page if many or all of the images 102 are displayed in an area that is close to the bottom of the web page 101. All or some subset of all of the images 102 may be subject to this evaluation.

The characteristics of the web page 100 may also be evaluated using type or content criteria. In selecting images for evaluation, for example, certain types of images that include excluded content, e.g., pornographic content, boilerplate, advertising content, or any content that is unrelated to the principal content of a web page, may be ignored, tagged or processed differently than other types of images. If a web page is classified as a gallery web page despite including excluded content, this excluded content may labeled or tagged, such that the excluded content is not shown in any search results that reference the web page.

Furthermore, the characteristics of the web page 100 may be evaluated based on Document Object Model (DOM) path criteria. Because the images of a gallery web page are typically displayed together and may therefore share a same or similar DOM path, the web page 100 may be classified as a gallery web page if more than a predefined number of images in the web page 100 share a same or similar DOM path, or if more than a predefined number of images in the web page 100 that share a same or similar DOM path satisfy other criteria. To increase processing efficiency, images from a web page 100 that share a same or similar DOM path with fewer than a predefined number of images, i.e., images that are not the principal content of the web page 100, may not be evaluated against this criteria.

Figure 2:
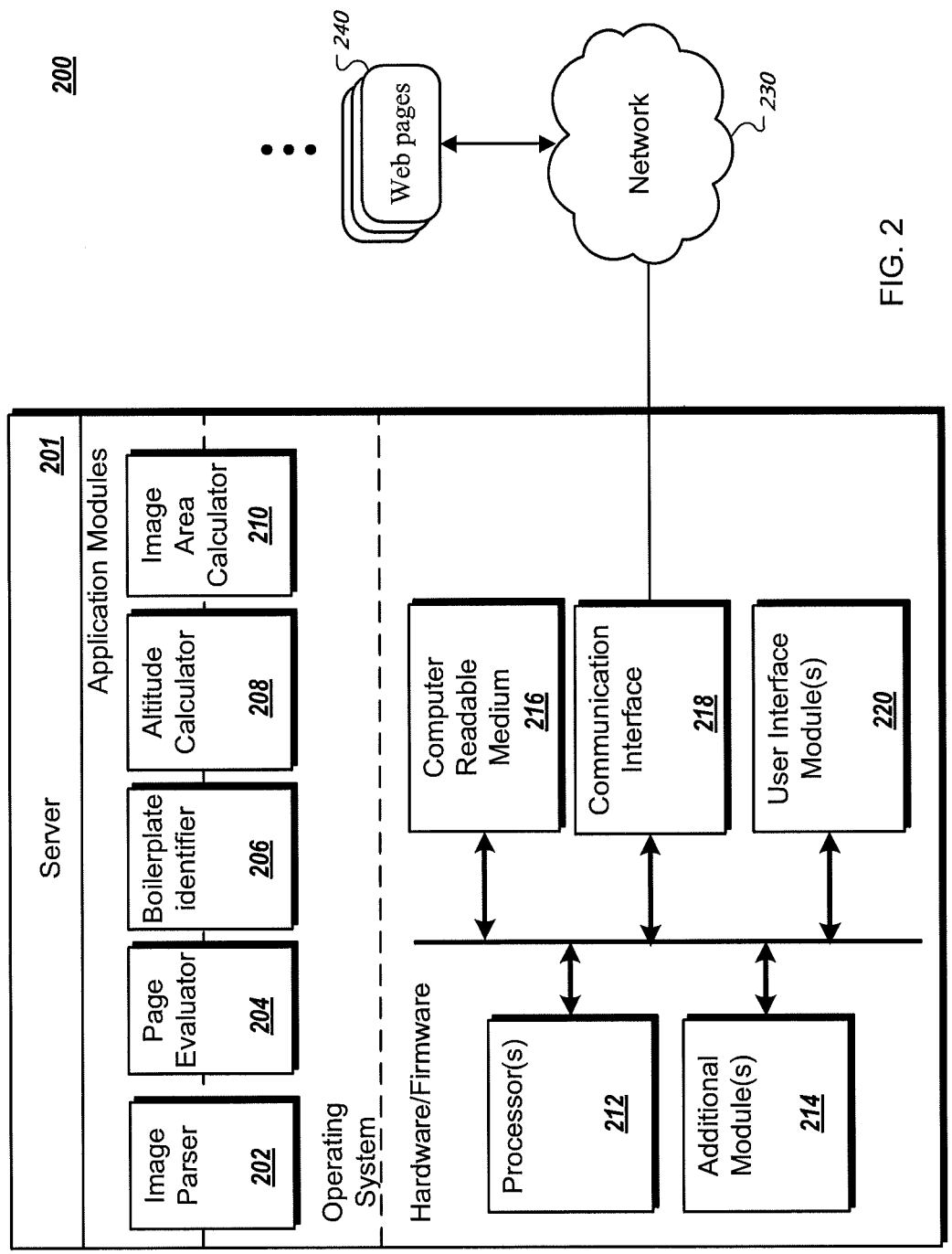
FIG. 2 is a block diagram of a server system for classifying web pages.

FIG. 2 is a block diagram of a server system 200 for automatically classifying web pages. The server system 200 includes a server 201 that is connected to the network 230, and that receives and processes web pages 240. In some implementations, a search engine crawls the web pages 240 and stores the web pages 240 in a search engine cache, and the server 201 classifies each of the web pages 240 that are stored in the search engine cache as gallery web pages or as not gallery web pages.

If a web page is classified as a gallery web page, the server 201 labels the web page as a gallery web page, e.g., by associating gallery-web-page-identifying data with the web page in the cache. This data may be, for example, a tag that identifies the web page as a gallery web page. The data that identifies the web page as a gallery web page may be stored in association with the web page, or separately from the web page.

The server 201 may also generate relevant information from the web page that is to be included in a search result that references the web page. Such relevant information may include, for example, data referencing the number of images included in the web page, a description of the images, or a thumbnail or preview image.

Server 201 includes a layer of hardware or firmware, including one or more processors 212, computer readable medium 216, a communication interface 218 that communicates with other clients over the network 230, user interface modules 220 and any additional modules 214. In addition to the hardware or firmware that supports the underlying functionality of the server 201, the server 201 also includes specialized application modules for classifying web pages as gallery web pages, through the evaluation of characteristics of web pages, and through scoring the web pages.

The specialized application modules for classifying web pages as gallery web pages may include an image parser 202, a page evaluator 204, a boilerplate identifier 206, an altitude calculator 208, and an image area calculator 210. The image parser 202 is configured to identify images included on the web page. The page evaluator 204, which is a type of classifier, is configured to apply criteria to the web page or the images of the web page to determine whether the web page is indeed a gallery web page.

The boilerplate page evaluator 204 identifies and optionally excludes boilerplate content on a web page from further processing, such as by excluding images that are included in boilerplate sections of the web page. The boilerplate page evaluator 204 may also flag images that are included in boilerplate sections, so that these images are not used for generating search results.

The altitude calculator 208 is configured to determine whether the location of an image is above or below a predefined absolute or relative height on the web page, and optionally to exclude images that are located above or below the predefined height. The altitude calculator 208 may, for example, exclude images that are positioned in the highest or lowest 10% or 25% of a web page, or that have top or bottom edges that are within "50" or "100" pixels from the top or bottom of a web page, respectively. Images that are located below the height that is predefined by the altitude calculator 208 may also be flagged by the altitude calculator 208, so that they are not used for generating search results.

The image area calculator 210 calculates a size characteristic (e.g., quantity of pixels, total height) of the images included on a web page, and compares the size characteristic with the amount of textual content (e.g., number of words) on the web page, to determine the amount of image content in relation to the amount of text content. The result of the calculation of the image area calculator 210 may be used by the page evaluator 204 to classify the web page as a gallery web page or as not a gallery web page if the ratio of the size characteristic to the amount of textual content exceeds or does not exceed a predefined threshold, respectively. Other modules may optionally be included on the server 201 in addition to or instead of the image parser 202, the page evaluator 204, the boilerplate identifier 206, the altitude calculator 208 and the image area calculator 210.

In some implementations, the server 201 may be a dedicated server that is used solely for classifying web pages as gallery web pages. Alternatively, the server 201 may include or may be associated with application modules for classifying web pages as gallery web pages, and application modules that perform the functionalities associated with a crawler or a search engine. One or more of these application modules may be implemented as a service that is located on another server, and that is connected to the server 201 though the network 230.

Figure 3:
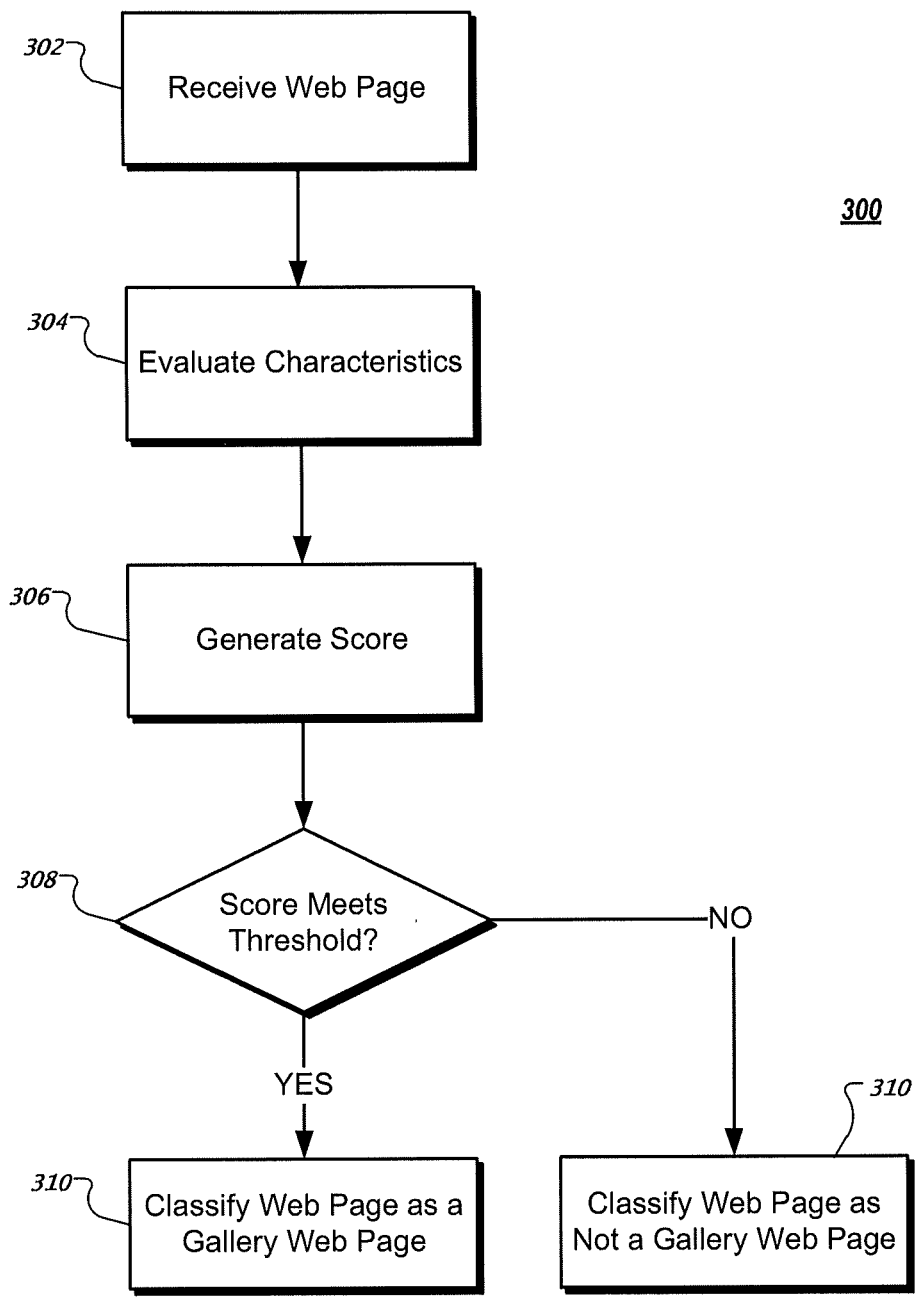
FIG. 3 is a flowchart illustrating a process for classifying web pages.

FIG. 3 is a flowchart illustrating a process 300 for classifying web pages. Briefly, the process 300 includes receiving a web page that includes text and one or more images, and evaluating one or more characteristics of the web page against predefined criteria. The process 300 also includes generating a score for the web page based on evaluating the characteristics of the web page against the predefined criteria, and classifying the web page as a gallery web page or as not a gallery web page when the score meets or does not meet a predefined threshold, respectively.

In more detail, when the process 300 begins, a web page that includes text and at least one image is received (302). The received web page may be, for example, an HTML document that includes text and at least one <IMG> element.

The characteristics of the web page are evaluated using predefined criteria (304). Evaluating the web page may include evaluating characteristics of the web page itself, or characteristics of the images included on the web page. Because gallery web pages typically include several images, one example criteria may specify a minimum quantity of images (e.g., 6 images) that should be included on the web page in order for the web page to be classified as a gallery web page. Evaluating the web page using this criteria may include counting the quantity of <IMG> elements included in an HTML document, or counting the quantity of <IMG> that satisfy other predefined criteria. Other example criteria are discussed with reference to FIG. 4.

A score is generated for the web page based on evaluating the characteristics of the web page against the predefined criteria (306). In one implementation, the score may equal the quantity of <IMG> elements counted in the HTML document that corresponds to the web page that meet (i.e., is greater than, or is greater or equal than) a predefined threshold quantity (e.g., "6").

In another example implementation, the score is generated by counting the number of images from the web page that individually meet the predefined criteria. For instance, generating the score may include counting the number of images from the web page that individually meet the predefined criteria. All of the images from the web page may be evaluated against the predefined criteria, or a subset of the images may be selected for evaluation beforehand.

If the score meets a predefined threshold (308, "Yes"), the web page is classified as a gallery web page (310). If the score does not meet a predefined threshold (308, "No"), the web page is classified as not a gallery web page (312). The web page may then be labeled or tagged with data that identifies it as a gallery web page, as unclassified, or as not a gallery web page.

Figure 4:
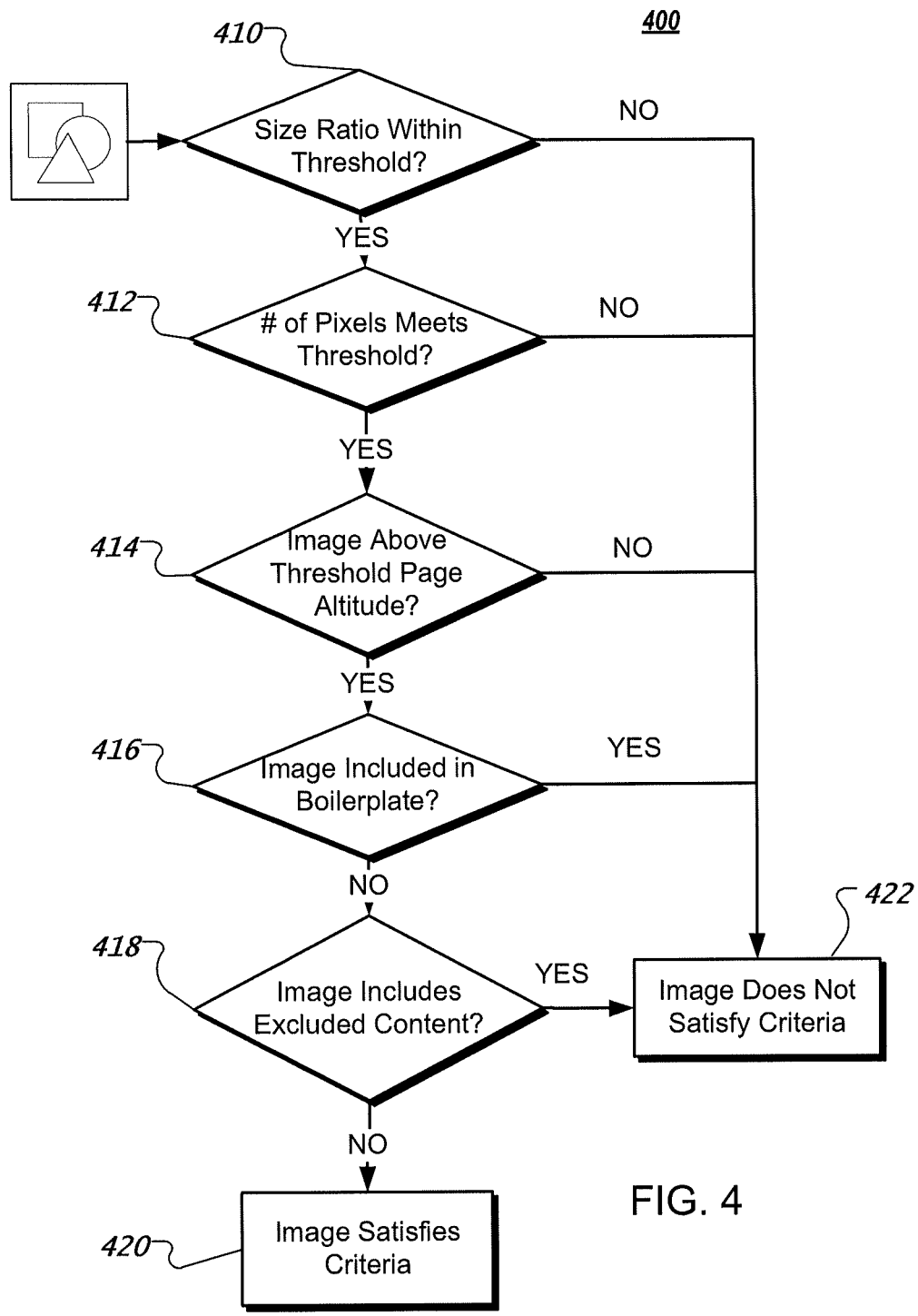
FIG. 4 is a flowchart illustrating an example process for determining whether an image satisfies predefined criteria.

FIG. 4 is a flowchart illustrating an example process 400 for determining whether an image satisfies predefined criteria. The process 400 may be iteratively performed on each image included on a web page, or on the subset of images of the web page that are selected for evaluation, in order to determine a total quantity of images that satisfy the predefined criteria. The total quantity of images that satisfy the predefined criteria may be used to generate the score for the web page. Although the example process 400 evaluates images based on size ratio criteria, pixel quantity criteria, image altitude criteria, boilerplate content criteria, and excluded content criteria, other processes may omit certain of these criteria, may use other criteria, or may evaluate images using these same criteria but in a different order.

The process 400 first evaluates an image using size ratio criteria (410). Size ratio criteria may be used to identify and exclude images that are tall and narrow, or short and wide. These characteristics may suggest that an image is associated with a banner ad, boilerplate content, or menu buttons.

In more detail, the size ratio of an image is evaluated to determine whether it matches a predefined target ratio, or whether it fits within a predefined range. In an example implementation where the predefined target ratio is "5:3" (width-to-height), evaluating the size ratio criteria for an image includes determining whether the width-to-height ratio of the image matches or exceeds "5:3." Any image whose width-to-height ratio is greater than "5:3," such as an image whose width-to-height ratio is "8:3," will be regarded as not satisfying the size ratio criteria (410, "No"), and will not be further evaluated (422).

Similarly, if the height-to-width of an image exceeds "3:5," such as an image whose height-to-width ratio is "3:8," it will be regarded as not satisfying the size ratio criteria (410, "No"), and will not be further evaluated (422). By contrast, an image with a size of "100×130" pixels will be regarded as satisfying the size ratio criteria (410, "Yes"), because its "10:13" size ratio is within the range of "1:1" to "5:3" (or "3:5"). Such an image, will be subject to further evaluation using additional predefined criteria.

The process 400 next evaluates the image using pixel quantity criteria (412). Pixel quantity criteria may be used to identify and exclude small images that, while exhibiting an acceptable size ratio, may be associated with buttons, icons, or other graphics that may be unrelated to the other content of the web page itself. In one example implementation in which a predefined threshold value is "3,600 pixels," evaluating the pixel quantity criteria includes determining whether the quantity of pixels of an image exceeds 3,600 pixels.

Any image that has fewer than 3,600 pixels will be regarded as not satisfying the pixel quantity criteria (412, "No"), and will not be further evaluated (422). By contrast, an image with 3,600 pixels or more than 3,600 pixels, such as an image with 100×130, or 13,000 pixels, will be regarded as satisfying the pixel quantity criteria (412, "Yes"), and will be subject to further evaluation using additional predefined criteria.

The process 400 next evaluates the image using image altitude criteria (414). The image altitude criteria may be used to identify and exclude images that are at the bottom of a web page, images which may be associated with boilerplate content or that may otherwise be unrelated to the other content of the web page itself. The altitude of an image may be expressed and evaluated in relative terms, such as by measuring whether an image is wholly or partially positioned in the lower "5%" of a web page, or in absolute terms, such as by measuring whether an image is wholly or partially positioned within the bottom "50 pixels" of the web page or outside the top "1000" pixels of the web page.

Figure 5:
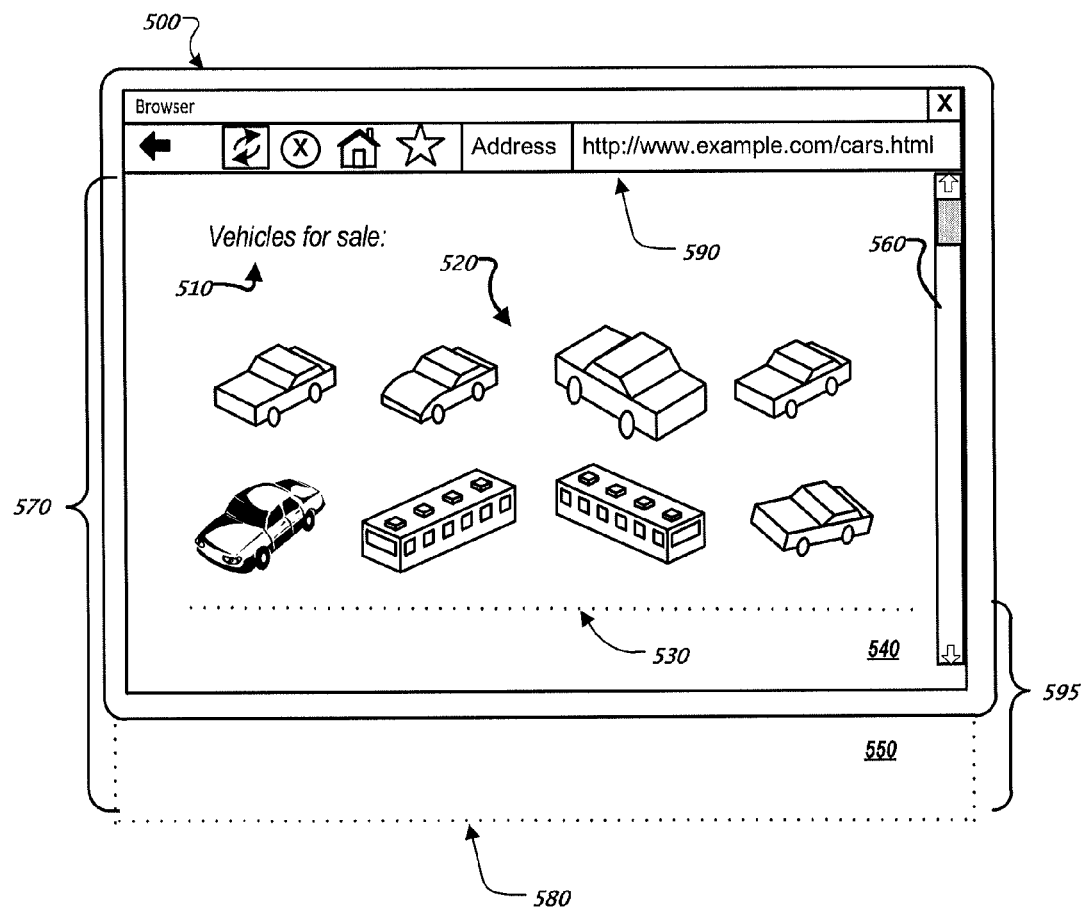
FIG. 5 illustrates an example web page that includes text and images.

The evaluation of an image using image altitude criteria is described with reference to FIG. 5. Specifically, FIG. 5 illustrates an example web page 500 that includes text 510 and images 520. In this example, the altitude of an image is defined by its bottom edge, therefore the altitude 530 of the lower four images is illustrated by a dotted line.

The web page 500 includes a visible section 540, which is an area of the web page that is within the viewable web browser window, and a non-visible section 550, which is an area of the web page 500 that is outside of the viewable web browser window. Portions of the non-visible area 540 may be made visible if the scroll bar 560 is manipulated to move the web page 500 downwards.

Height 570 refers to the distance from the bottom 580 of the web page 500 to the top 590 of the web page 500, and height 595 refers to the distance between the bottom 580 of the web page and the altitude 530 of the lower four images. In an example implementation, the predefined threshold value is expressed as a percentage (e.g., "20%"), and evaluating the image altitude criteria for the lower four images includes determining if a ratio of the height 595 to the height 570 is above the predefined threshold value. In another example implementation, the predefined threshold value is expressed as a quantity of pixels (e.g., "50 pixels"), and evaluating the image altitude criteria for the lower four images includes determining if the height 595 exceeds the predefined threshold value.

Referring back to FIG. 4, any image whose altitude is not above the predefined threshold will be regarded as not satisfying the image altitude criteria (414, "No"), and will not be further evaluated (422). By contrast, an image whose altitude is above the predefined threshold value will be regarded as satisfying the image altitude criteria (414, "Yes"), and will be subject to additional evaluation.

The image is also evaluated using boilerplate content criteria (416). The boilerplate content of a web page may be texts and/or images that appear on different web pages on the same web site, for example, navigational icons or hypertexts, copyright information, contact information, legal disclaimers, etc. Images that are included in boilerplate content sections are unlikely to be related to the other content of the web page itself. Determining whether the image is included in a section of the web page that is associated with boilerplate content includes providing the web page to a module that is adapted to detect boilerplate content within a web page, and receiving information from the boilerplate content detection module that identifies any potential boilerplate content.

If the image is in a section of the web page that has been identified as including boilerplate content (416, "Yes"), the image will be regarded as not satisfying the boilerplate content criteria, and will not be further evaluated (422). If the image is not in a section of the web page that has been identified as including boilerplate content, or is in a section of the web page that has been identified as not including boilerplate content (416, "No"), the image will be subject to further evaluation.

In process 400, the image is lastly evaluated using excluded content criteria (418). The content of an image may be important for determining whether a web page is to be classified as a gallery web page or, if the gallery web page is classified as a web page, whether the image should appear in a gallery-web-page-specific search result. Determining whether the image includes excluded content includes providing the image or the web page to a module that is adapted to detect excluded content, and receiving information from the excluded content detection module that identifies whether the image includes excluded content.

If an image is determined to include excluded content, e.g., pornographic content or advertising content, the web page may be deemed to satisfy the excluded content criteria to a lesser extent, a search result format that is not specific to gallery web pages may be used, even though the web page may be classified as a gallery web page, or the search result may not show the image that is determined to include the excluded content. If the image includes excluded content (418, "Yes"), the image will be regarded as not satisfying the excluded content criteria, and will not be further evaluated (422). If the image does not include excluded content (418, "No"), the image will be regarded as satisfying the predefined criteria associated with the process 400.

After each of the images on a web page having been evaluated, a score is generated based on the total quantity of images that satisfy the various predefined criteria, and the score is compared with a predefined threshold value. If the score is equal to or larger than the predefined threshold value, the web page is classified as a gallery web page. If not, the web page is classified as not a gallery web page, or is left unclassified.

Figure 7:
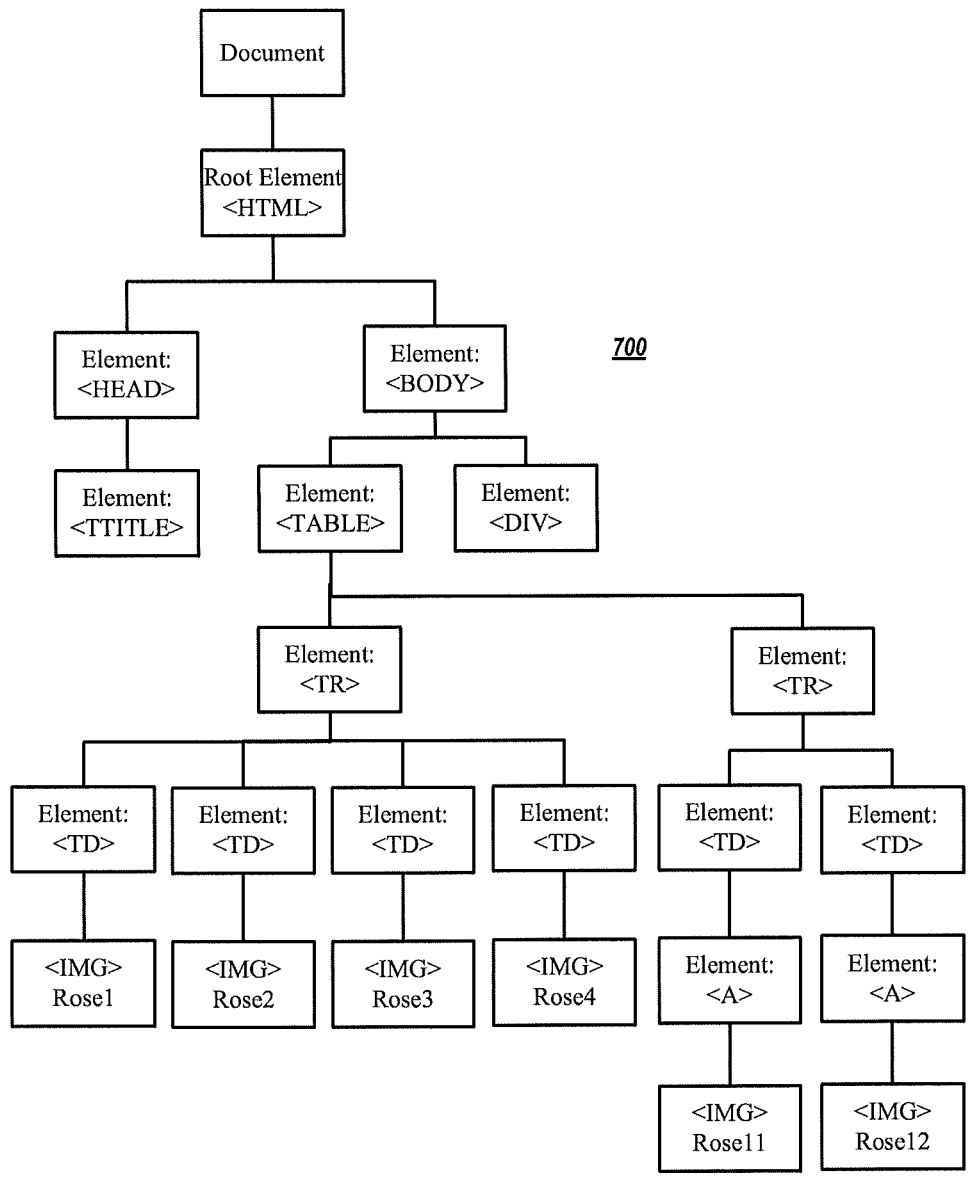
FIG. 7 is tree representation of the hierarchy of the HTML elements in the HTML document of FIG. 6.
Figure 8A:
Figure 8B:
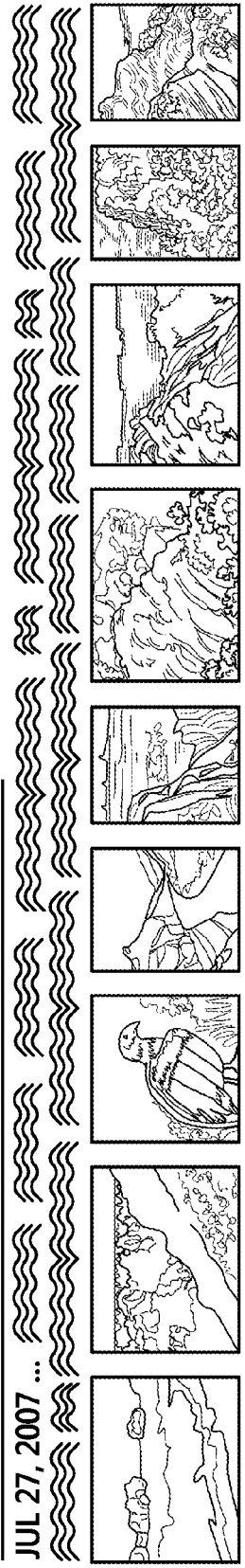

In an additional implementation, illustrated in FIGS. 6 and 7, the DOM path of images of a web page may be used to select images that are to be subject to evaluation using the predefined criteria, or the web page may be classified as a gallery web page based on DOM path criteria. FIG. 6 is an example of an HTML document 600 containing various HTML elements for displaying images, and FIG. 7 is a tree representation 700 of the hierarchy of the HTML elements in the HTML document of FIG. 6.

A subset of the images of a web page may be selected, and only the subset of the images may be evaluated using the predefined criteria. The HTML document 600 of the web page may be parsed to identify the particular DOM path of each image in the hierarchy of the HTML elements. As can be seen from FIG. 7, the images of "rose1", "rose2", "rose3" and "rose4" all have the same DOM path of "<HTML> <BODY> <TABLE> <TR> <TD>", and the images of "rose11" and "rose12" have the same DOM path of "<HTML> <BODY> <TABLE> <TR> <TD> <A>".

In this example, the images of "rose1", "rose2", "rose3" and "rose4" will be determined as belonging to a first group of images having a DOM path of "<HTML> <BODY> <TABLE> <TR> <TD>", and the images of "rose11" and "rose12" belonging to a second group have a DOM path of "<HTML> <BODY> <TABLE> <TR> <TD> <A>".

The quantity of images in each group is determined, and is evaluated using DOM path group criteria. In the example shown in FIG. 7, the size of the first group is "4" and the size of the second group is "2". The size of different groups of images having different DOM paths are further ordered, and the size of the largest group is compared to a predefined threshold value. If the size of the largest group is found to be equal to or larger than the predefined value, the web page is regarded as having satisfied the DOM path group criteria, and may be classified as a gallery web page. If the size of the largest group of images having the same DOM path includes fewer images than the threshold value, the web page is regarded as having not satisfied the DOM path group criteria, and may be classified as not a gallery web page. In one implementation, this threshold value for the size of the largest group is set to four.

In an alternative implementation, only the images in the groups having a size equal to or larger than a predefined group size may be selected a subset for evaluation using other predefined criteria, images in the groups having a size smaller than a predefined group size may be ignored or discarded. Such an approach reflects the recognition that gallery images on a gallery web page are typically similarly arranged for display during the creation of the web page, and therefore they are likely to share a same DOM path in the HTML document of the web page.

In another alternative implementation, evaluation of a web page may include skipping certain HTML elements that do not have a significant effect on the formatting or arrangement of displayed images. For example, the pair of the HTML elements "<a>" and "</a>" simply embeds a hyperlink for the content enclosed therebetween. If an image is enclosed within these HTML elements, the image will be displayed in a similar manner as other images that do not share the same DOM path, however the image will be selectable.

For example, in FIG. 7, the DOM path of the image "rose11" is only different from the DOM path of "rose4" in that it has an additional "<a>" element immediately before the <IMG> element. In this case, the HTML element "<a>" may be disregarded in determining the DOM path of a specific image. Hence, all the images referenced in the example HTML document in FIG. 6 may be regarded as falling within the same group, having a size of "6." If the images in this example satisfy the remaining predefined criteria, the web page will then be determined to meet the requirement on the number of images, and may be classified as a gallery web page.

Additional criteria may be further applied against on the web page to avoid false positives or negatives resulting from the evaluation of other criteria. For example, the total number of pixels of all the images of a web page can be determined and compared with the total area (in pixels) of the entire web page, to see if the ratio exceeds a predefined ratio, for example, 60%. If the ratio is below this predefined ratio, the images cover less than a predefined area of the entire web page, and the web page may not be classified as a gallery web page.

In another alternative, the ratio of the number of pixels of all the candidate gallery images versus the amount of textual contents displayed can also be calculated and determined to see if it is over a threshold value. The amount of the textual contents displayed can be the number of words in the sections other than the boilerplate section on the web page and displayed to the user when the web page is rendered. This threshold ratio can be set to "3,000:1," for example. Any web page having a ratio of the total number of pixels of all the candidate gallery images versus the number of words on the web page equal to or higher than this threshold value can be thought of as an image-intensive web page and thereby qualified to be a gallery web page, provided that the other tests having been passed.

Systems for identifying gallery web pages using any one of the implementations as set forth above can be used to assist a search engine in classifying web pages crawled from the Web as either being a gallery web page or as not being a gallery web page. Further processes can be performed to prepare the web page and the identified gallery images in the web page to be presented in a search result.

For example, the total number of images can be recorded in the cache of indexed web pages, and for each image, a separate thumbnail or preview image within a predefined size range can be created and stored. Preview or thumbnail images may not be prepared and stored for images that include excluded content. A particular search result format that is specific to gallery web pages may present search results that include information specifying a total number of images on a particular gallery web page, thumbnails of at least a subset of these images, and a snippet of textual content of the gallery web page, if the web page is identified by a search engine in response to a particular search query.

FIGS. 8A-8E are different examples of search results that reference gallery web pages. For a particular search query "photos of grand canyon," if any one of the search results is found to be a gallery web page, the number of gallery images and the thumbnail images can be displayed in different layouts, as shown in the examples in FIGS. 8A-8E.

Further, as the number of thumbnail images shown in a search result may not cover all the gallery images identified for the web page, a subset of these gallery image can be selected sequentially, or randomly or in any other particular manner, to be presented in the search result. Alternatively, in order for a user to browse to the other preview images of the gallery images without visiting the actual web page, navigational icons may be arranged beside these thumbnail images to assist the user in viewing these other preview images not initially shown in the search result.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a backend component, e.g., as a data server, or that includes a middleware component, e.g., an application server, or that includes a front-end component, e.g., a client computer having a graphical user interface or a web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
receiving a web page that includes text and images;
selecting a first subset of the images that are not excluded content-type images, wherein an excluded content-type image is an image that is boilerplate content or that is advertising content;
determining, for each of the images in the first subset, (I) whether the image has a size ratio that is within a predetermined size ratio range, (II) whether the image has greater than a predetermined quantity of pixels, or (III) whether the image is located between a defined minimum altitude and a defined maximum altitude on the web page;
selecting a second subset of the images in the first subset based on the determinations for the images in the first subset;
determining (i) a quantity of images in the second subset, and (ii) a ratio of the area of the web page that is covered by the images of the second subset to the total area of the web page;
generating a score for the web page based at least on (i) the quantity of the images in the second subset, and (ii) the ratio of the area of the web page that is covered by the images to the total area of the web page;
classifying the web page as a gallery web page based on the score for the web page meeting a predefined threshold; and
based on classifying the web page as a gallery web page, formatting a search result that references the web page, among a set of search results that each reference a different web page, using a search result format that is designated for web pages that are classified as gallery web pages.

2. The method of claim 1, wherein generating a score for the web page comprises generating a score for the web page based on evaluating an amount of text that is not included in a boilerplate section of the web page, against a maximum value.

3. The method of claim 1, wherein generating a score for the web page comprises generating a score for the web page based on evaluating the quantity of images in the second subset against a minimum value.

4. The method of claim 1, wherein generating a score for the web page comprises generating a score for the web page based on evaluating a quantity of the images in the web page that share a same Document Object Model (DOM) path, against a minimum value.

5. The method of claim 1, further comprising determining that the score for the web page meets a predefined threshold;
wherein the web page is classified as a gallery web page in response to determining that the score for the web page meets the predefined threshold.

6. The method of claim 1, comprising:
labeling the web page that is classified as a gallery web page, as a gallery web page.

7. The method of claim 1, wherein a gallery web page is a web page in which its principal content is images.

8. The method of claim 1, wherein selecting the first subset of the images comprises selecting images that are not included in a boilerplate section of the web page and that are not included in an advertising section of the web page.

9. The method of claim 8, wherein generating a score for the web page comprises generating a score for the web page based on evaluating an amount of text that is not included in the boilerplate section of the web page and that is not included in the advertising section of the web page, against a maximum value.

10. A system comprising:
one or more computers and one or more storage devices storing instructions that are operable, when executed by the one or more computers, to cause the one or more computers to perform operations comprising:
receiving a web page that includes text and images;
selecting a first subset of the images that are not excluded content-type images, wherein an excluded content-type image is an image that is boilerplate content or that is advertising content;
determining, for each of the images in the first subset, (I) whether the image has a size ratio that is within a predetermined size ratio range, (II) whether the image has greater than a predetermined quantity of pixels, or (III) whether the image is located between a defined minimum altitude and a defined maximum altitude on the web page;
selecting a second subset of the images in the first subset based on the determinations for the images in the first subset;
determining (i) a quantity of images in the second subset, and (ii) a ratio of the area of the web page that is covered by the images of the second subset to the total area of the web page;

generating a score for the web page based at least on (i) the quantity of the images in the second subset, and (ii) the ratio of the area of the web page that is covered by the images to the total area of the web page classifying the web page as a gallery web page based on the score for the web page meeting a predefined threshold; and based on classifying the web page as a gallery web page, formatting a search result that references the web page, among a set of search results that each reference a different web page, using a search result format that is designated for web pages that are classified as gallery web pages.

11. The system of claim 10, wherein generating a score for the web page comprises generating a score for the web page based on evaluating an amount of text that is not included in a boilerplate section of the web page, against a maximum value.

12. The system of claim 10, wherein generating a score for the web page comprises generating a score for the web page based on evaluating the quantity of images in the second subset against a minimum value.

13. The system of claim 10, wherein generating a score for the web page comprises generating a score for the web page based on evaluating a quantity of the images in the web page that share a same Document Object Model (DOM) path, against a minimum value.

14. The system of claim 10, wherein the operations further comprise determining that the score for the web page meets a predefined threshold; and
wherein the web page is classified as a gallery web page in response to determining that the score for the web page meets the predefined threshold.

15. The system of claim 10, wherein the operations comprise:
labeling the web page that is classified as a gallery web page, as a gallery web page.

16. The system of claim 10, wherein a gallery web page is a web page in which its principal content is images.

17. The system of claim 10, wherein selecting the first subset of the images comprises selecting images that are not included in a boilerplate section of the web page and that are not included in an advertising section of the web page.

18. The system of claim 17, wherein generating a score for the web page comprises generating a score for the web page based on evaluating an amount of text that is not included in the boilerplate section of the web page and that is not included in the advertising section of the web page, against a maximum value.

19. A computer storage medium encoded with a computer program, the program comprising instructions that when executed by one or more computers cause the one or more computers to perform operations comprising:
receiving a web page that includes text and images;
selecting a first subset of the images that are not excluded content-type images, wherein an excluded content-type image is an image that is boilerplate content or that is advertising content;
determining, for each of the images in the first subset, (I) whether the image has a size ratio that is within a predetermined size ratio range, (II) whether the image has greater than a redetermined quantity of pixels or (III) whether the image is located between a defined minimum altitude and a defined maximum altitude on the web page;
selecting a second subset of the images in the first subset based on the determinations for the images in the first subset;
determining (i) a quantity of images in the second subset, and (ii) a ratio of the area of the web page that is covered by the images of the second subset to the total area of the web page;
generating a score for the web page based at least on (i) the quantity of the images in the second subset, and (ii) the ratio of the area of the web page that is covered by the images to the total area of the web page;
classifying the web page as a gallery web page based on the score for the web page meeting a predefined threshold; and
based on classifying the web page as a gallery web page, formatting a search result that references the web page, among a set of search results that each reference a different web page, using a search result format that is designated for web pages that are classified as gallery web pages.

20. The medium of claim 19, wherein generating a score for the web page comprises generating a score for the web page based on evaluating a quantity of the images in the web page that share a same Document Object Model (DOM) path, against a minimum value.

21. The medium of claim 19, wherein generating a score for the web page comprises generating a score for the web page based on evaluating an amount of text that is not included in a boilerplate section of the web page, against a maximum value.

22. The medium of claim 19, wherein generating a score for the web page comprises generating a score for the web page based on evaluating the quantity of images in the second subset against a minimum value.

23. The medium of claim 19, wherein the operations further comprise determining that the score for the web page meets a predefined threshold; and
wherein the web page is classified as a gallery web page in response to determining that the score for the web page meets the predefined threshold.

24. The medium of claim 19, wherein the operations comprise:
labeling the web page that is classified as a gallery web page, as a gallery web page.

25. The medium of claim 19, wherein a gallery web page is a web page in which its principal content is images.

26. The medium of claim 19, wherein selecting the first subset of the images comprises selecting images that are not included in a boilerplate section of the web page and that are not included in an advertising section of the web page.

27. The medium of claim 26, wherein generating a score for the web page comprises generating a score for the web page based on evaluating an amount of text that is not included in the boilerplate section of the web page and that is not included in the advertising section of the web page, against a maximum value.

* * * * *